O. L. GOOCH.
GAMBREL.
APPLICATION FILED APR. 7, 1917.
1,259,012.
Patented Mar. 12, 1918.
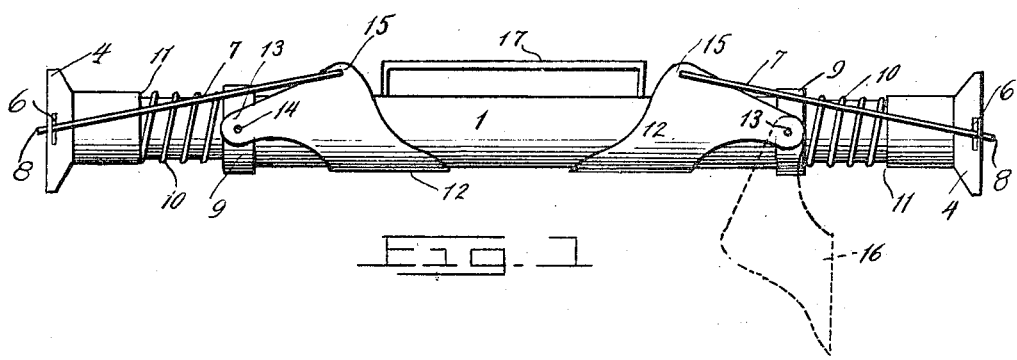
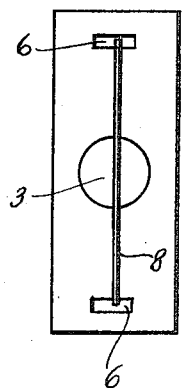
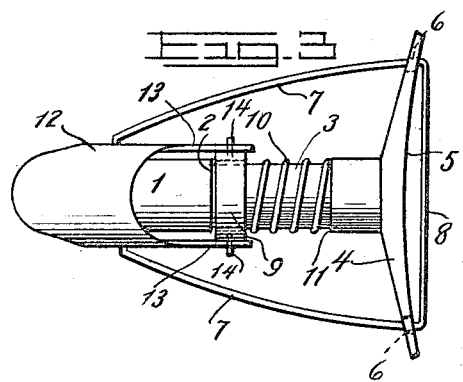
Inventor
O. L. Gooch
By W. D. Asbury
Attorney

UNITED STATES PATENT OFFICE.

OVIE L. GOOCH, OF OTTUMWA, IOWA.

GAMBREL.

1,259,012.    Specification of Letters Patent.    Patented Mar. 12, 1918.

Application filed April 7, 1917. Serial No. 160,363.

*To all whom it may concern:*

Be it known that I, OVIE L. GOOCH, a citizen of the United States, residing at Ottumwa, in the county of Wapello and State of Iowa, have invented certain new and useful Improvements in Gambrels, of which the following is a specification.

This invention relates particularly to an improved gambrel for suspending hogs, and it has for its primary aim to provide a novel supporting device which has means for engaging the carcass or body of an animal without mutilating the flesh thereof.

The invention consists in a novel spring clamp through which the legs of the animal pass for being gripped in a yieldable manner and yet with sufficient force to support the suspended body in a practical and efficient way.

The invention further resides in the features of construction and the arrangements and combinations of parts hereinafter described in detail, succinctly defined in the appended claims, and illustrated in the accompanying drawing wherein Figure 1 is a side elevation of my improved gambrel;

Fig. 2 is an end elevation thereof; and Fig. 3 is a bottom plan view of one end thereof.

Referring to like parts with corresponding characters of reference, the numeral 1 designates a bar constituting the gambrel body which has its ends reduced to provide an annular shoulder 2 adjacent each extremity.

On each reduced cylindrical end portion 3 is secured a fixed clamping or gripping jaw 4 which is flared outwardly to provide a broad seating face 5 that is transversely concave, as depicted in Fig. 3. A vertical slot 6 is formed in each end portion of each fixed jaw, and through these slots operate the arms 7 of U-shaped jaw 8.

Slidable on each reduced cylindrical end portion 3 is a collar or sleeve 9 which is yieldingly held against the respective shoulder 2 by a coiled spring 10 that is interposed between said sleeve and a shoulder 11 formed by the fixed jaw. An operating lever 12 of U-section, to straddle the body 1, has a pair of opposing legs 13 which are pivotally connected to diametrically opposite points on the sleeve by pins 14. Extending upwardly from the lever, and on opposite sides of the gambrel body, is a pair of side ears 15 having eyes in which the free ends of the arms 7 pivotally engage. When the levers 12 are moved to operative or clamping position, the jaw arms 7 are moved past dead center and consequently tend to hold the levers operative.

In practice, the movable jaws are opened by swinging the levers to the position indicated at 16 in Fig. 1, and the legs of the animal to be suspended are then passed through the loop thus formed by the U-jaw and its companion fixed jaw. Upon swinging the levers upwardly, or to operative position, the sleeves supporting the levers will slide forward under the force applied to the levers and against the springs 10, to permit the levers swinging to closed position against the body 1. In this position, the arms 7 are disposed above the pivots 14 and thereby exert a closing pull on the levers to prevent accidental opening of jaws.

The device is exceedingly practical since it does not tear or mutilate the flesh, which latter is one disadvantage found in that type of gambrel having piercing points. The gripping pressure may readily be controlled by the tension of the coiled springs, and the jaws are locked by the connection between the levers and the U-jaws.

It is understood that minor changes, such as fall within the scope of the appended claims, may be resorted to in the manufacture of the present gambrel. Suitable means may be provided for suspending the body, as a handle or loop 17.

What is claimed is

1. In a gambrel comprising a body having a reduced end portion, and a shoulder at the inner end of said reduced portion, a fixed jaw on said end portion having a broad transversely concave face which is provided on opposite sides with vertical slots, a sleeve slidable on said reduced end portion between the adjacent shoulder and the fixed jaw, a coiled spring interposed between the latter and the sleeve to hold the latter against the shoulder, and a lever of U-section to straddle the body and provided with opposing legs pivoted to the sleeve, said lever further having upwardly extending ears, and a U-shaped movable jaw for each fixed jaw having its arms operating through the slots of the latter and pivoted to the ears of the lever.

2. In a gambrel comprising a body having a shoulder adjacent one terminal, a fixed jaw on said end of the body, said jaw having spaced openings through its face, a sleeve slidable on said end between the shoulder and the fixed jaw, a spring interposed between said sleeve and the adjacent jaw to tend to hold the sleeve against the shoulder, a lever pivoted on said sleeve and having opposing side ears straddling the body, and a U-shaped movable jaw having its arms passing through the openings of said fixed jaw and pivoted to the side ears of the lever.

3. In a gambrel, a body, a fixed jaw on one end thereof, a sleeve slidable on said end portion of the body, a spring interposed between the sleeve and the fixed jaw on said end of the body, a lever pivoted on said sleeve, and a U-shaped jaw slidably related to the fixed jaw and having its arms pivoted to the lever.

4. In a gambrel, a body, a fixed jaw on one end thereof, a sleeve slidable on the body adjacent said jaw, a lever having opposing legs pivoted to said sleeve, yieldable means between said sleeve and the adjacent jaw, and a movable jaw slidably related to said fixed jaw and having pivotal connection with the lever.

5. In a gambrel, a body, a fixed jaw thereon, a movable jaw slidably supported by the fixed jaw, a lever pivotally connected to each movable jaw, and means slidably and pivotally connected to the body.

6. In a gambrel, a body, a fixed jaw thereon, a movable jaw slidably related to the fixed jaw, a lever pivotally connected to the movable jaw, and a yieldable support on the body to which the lever is pivoted.

7. In a gambrel, a body, a fixed jaw thereon, a movable jaw slidably connected to the fixed jaw, a longitudinally movable sleeve on the body, and a lever pivoted on the sleeve and operatively connected to the movable jaw.

In testimony whereof I affix my signature.

OVIE L. GOOCH.

Copies of this patent may be obtained for five cents each, by addressing the "Commissioner of Patents, Washington, D. C."